(12) United States Patent
Kumamoto

(10) Patent No.: US 6,891,933 B2
(45) Date of Patent: May 10, 2005

(54) COMMUNICATION APPARATUS

(75) Inventor: Yoshihito Kumamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 09/833,191

(22) Filed: Apr. 11, 2001

(65) Prior Publication Data

US 2002/0071528 A1 Jun. 13, 2002

(30) Foreign Application Priority Data

Dec. 8, 2000 (JP) ........................................ 2000-373828

(51) Int. Cl.[7] .............................................. H04M 1/64
(52) U.S. Cl. ..................... 379/88.12; 455/413; 709/217
(58) Field of Search .......................... 379/88.11, 88.12, 379/88.13, 88.14, 88.17; 455/413; 709/217, 218

(56) References Cited

U.S. PATENT DOCUMENTS 4,853,952 A * 8/1989 Jachmann et al. ....... 379/88.11
6,498,835 B1 * 12/2002 Skladman et al. ....... 379/88.12
6,516,203 B1 * 2/2003 Enzmann et al. ........ 455/556.1
6,530,018 B2 * 3/2003 Fleming, III ................... 713/1

FOREIGN PATENT DOCUMENTS

JP 2000032139 1/2000

* cited by examiner

Primary Examiner—Fan Tsang
Assistant Examiner—Ming Chow
(74) Attorney, Agent, or Firm—Katten Muchin Zavis Rosenman

(57) ABSTRACT

A communication apparatus capable of improving convenience of voice mail service. Voice message storing unit stores voice messages in association with respective message numbers. User information management unit manages user information about voice mail users. When transmitting registration notification information notifying the registration of a voice message, registration notification information transmitting unit changes the form of notification of the registration notification information in accordance with address information registered in the user information, and transmits the resulting registration notification information to a recipient. Voice message replaying unit replays the voice message and transmits the replayed message to the recipient through a voice channel.

8 Claims, 13 Drawing Sheets

12-1 PERSONAL INFORMATION LIST

| USER NO. | USER NAME | PASSWORD | PHONE NO. | MAIL ADDRESS | MULTICAST RECIPIENT LIST NO. | | | | RESERVED REPLAY MESSAGE NO. |
|---|---|---|---|---|---|---|---|---|---|
| | | | | | USED | REGISTRATION A | REGISTRATION B | REGISTRATION C | |
| -- | -- | -- | -- | -- | -- | -- | -- | -- | -- |
| 0101 | Ichiro | ***** | 090-xxxx-1111 | Ichiro@xxx.co.jp | A | 022 | 035 | | |
| 0102 | Jiro | ***** | 090-xxxx-2222 | Jiro@xxx.co.jp | | | | | |
| 0103 | Saburo | ***** | | Saburo@xxx.co.jp | | | | | |
| 0104 | Hanako | ***** | 090-xxxx-4444 | Hanako@xxx.co.jp | | | | | 00004 |
| 0105 | Shiro | ***** | 090-xxxx-5555 | | | | | | |
| -- | -- | -- | -- | -- | -- | -- | -- | -- | -- |

FIG. 3

12-2 MULTICAST RECIPIENT LIST

| MULTICAST RECIPIENT LIST NO. | USER NO. | | | | | |
|---|---|---|---|---|---|---|
| | MULTICAST RECIPIENT B1 | MULTICAST RECIPIENT B2 | MULTICAST RECIPIENT B3 | MULTICAST RECIPIENT B4 | ... | MULTICAST RECIPIENT Bn |
| -- | -- | -- | -- | -- | -- | -- |
| 021 | 0099 | 0100 | | | ... | |
| 022 | 0102 | 0103 | 0104 | 0105 | ... | |
| 023 | 0102 | 0110 | 0130 | | ... | |
| -- | -- | -- | -- | -- | -- | -- |

FIG. 4

12-3 QUEUE MANAGEMENT LIST

| USER NO. | MESSAGE NO. | | | | | |
|---|---|---|---|---|---|---|
| | QUEUE Q1 | QUEUE Q2 | QUEUE Q3 | QUEUE Q4 | --- | QUEUE Qn |
| --- | --- | --- | --- | --- | --- | --- |
| 0101 | 00004 | --- | | | --- | --- |
| 0102 | 00003 | 00004 | | | --- | --- |
| 0103 | 00004 | --- | --- | --- | --- | --- |
| --- | | | | | --- | --- |

XXX is to be held on Xth of X.
If you wish to participate,
please register your personal information.

------

To register personal information,
click the following URL,
then enter the necessary items and send back.

http://voice.xxx.co.jp/cgi-bin/regist.cgi?

action=regist&UID=0103

G21

| | |
|---|---|
| User Name: | |
| Password: | |
| Password (Enter again): | |
| Mail Address: | Saburo@xxx.ne.jp |
| Phone No.: | |

Register  Cancel

FIG. 13

COMMUNICATION APPARATUS

BACKGROUND OF THE INVENTION (1) Field of the Invention

The present invention relates to a communication apparatus, and more particularly, to a communication apparatus for controlling communications of electronic mail.

(2) Description of the Related Art

Electronic mail includes text mail, voice mail, etc., and with recent popularization of portable telephones (including PHS), more and more users have come to use electronic mail as a typical tool for communicating information.

Meanwhile, portable telephones, which are small in size because portability is an important factor determining their design, are equipped only with a small-sized display and several operation buttons and thus are not suited for sending complicated information by text mail. In recent years, therefore, voice mail is widely used in which information is registered in the form of voice and a recipient is notified of the information by voice.

Voice mail is a service whereby speech on the telephone is stored in a server to allow exchange of vocal information between users. Conventional voice mail services can be classified into two types: a type wherein a registered voice message is encoded to generate voice data, which is then transmitted to the recipient at a specified time and decoded and replayed at the recipient side, and a type wherein a recipient inquires of the server whether any mail has arrived, and can listen to a voice message, if any, as in telephone answering service.

In the former case of transmitting a voice message in the form of voice data, however, since a voice message is large in data size, a correspondingly large channel capacity is required to receive voice data. Also, if the receiver side is not equipped with the function of storing, decoding and replaying voice data, the recipient is unable to enjoy this type of service. In the latter type of service similar to the telephone answering service, the recipient needs to inquire of the server whether any mail has arrived, and therefore, this type of service is inferior in terms of convenience.

There has also been proposed, in Unexamined Japanese Patent Publication No. 2000-32139, a technique of equipping a server with a speech recognition apparatus such that a voice message input by voice is converted into text, which is then transmitted to a recipient side as text mail.

However, even with this conventional technique, if the amount of information contained in a voice message is large, the size of the converted text correspondingly increases, with the result that the text fails to be fully displayed on the display of a portable telephone or the like. A problem therefore arises in that the advantage of registering an originator's message by voice cannot be made full use of.

SUMMARY OF THE INVENTION

The present invention was created in view of the above circumstances, and an object thereof is to provide a communication apparatus which is designed to improve the convenience of voice mail service.

To achieve the above object, there is provided a communication apparatus for controlling communications of electronic mail. The communication apparatus comprises voice message storing means for storing a voice message in a manner associated with a message number, user information management means for managing user information about voice mail users, registration notification information transmitting means for changing a form of notification of registration notification information notifying that the voice message has been registered, in accordance with address information registered in the user information and transmitting the resulting registration, notification information to a recipient, and voice message replaying means for replaying the voice message and transmitting the replayed voice message to the recipient through a voice channel.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing a personal information list;

FIG. 4 is a diagram showing a multicast recipient list;

FIG. 5 is a diagram showing a queue management list;

FIG. 13 is a diagram also showing a series of screens displayed when the process of registering/updating the personal information list is performed.

DESCRIPTION OF THE PREFERRED EMBODIMENTS

Figure 1:
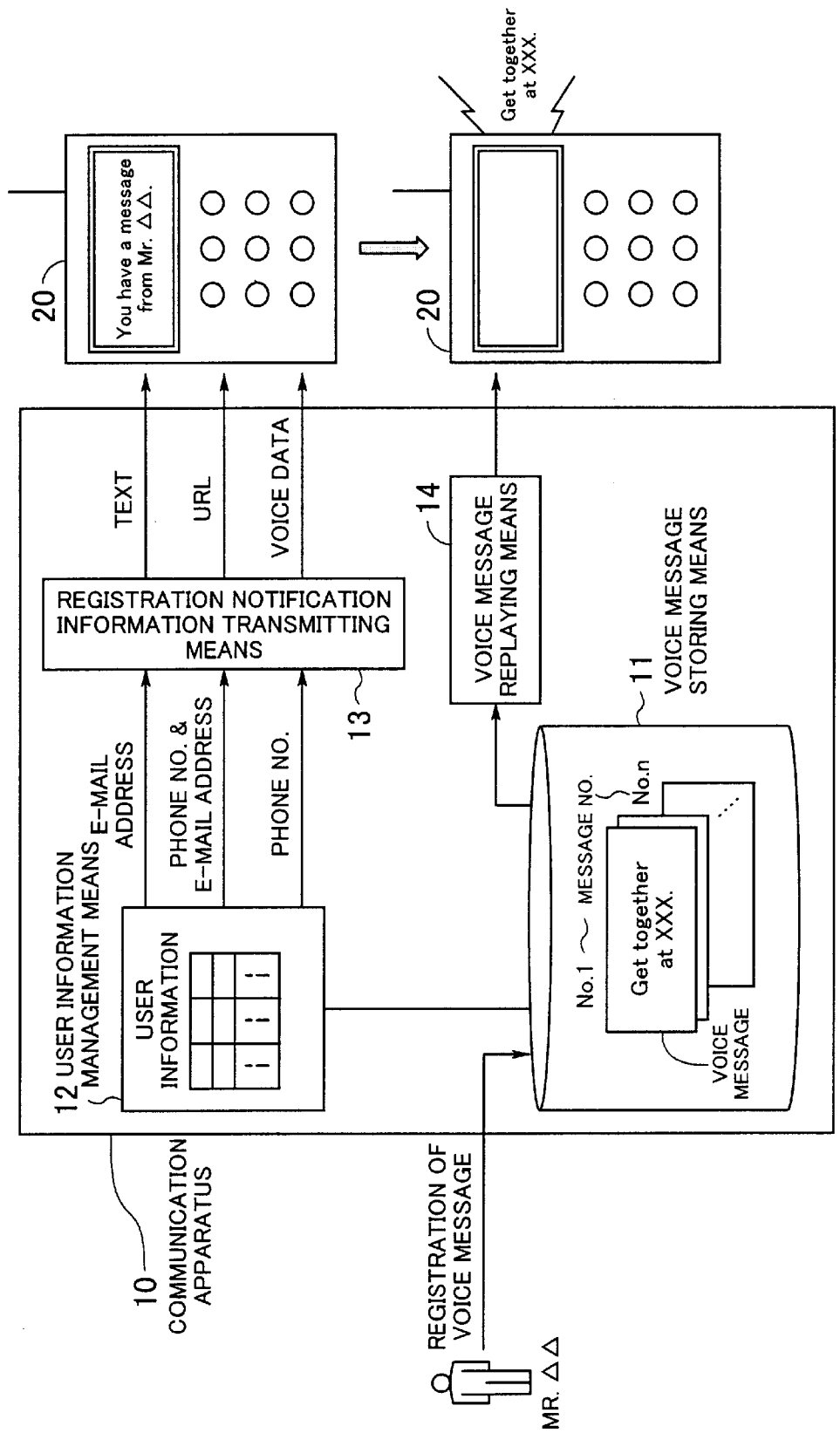
FIG. 1 is a diagram illustrating the principle of a communication apparatus according to the present invention.

An embodiment of the present invention will be hereinafter described with reference to the drawings. FIG. 1 illustrates the principle of a communication apparatus 10 according to the present invention, wherein the communication apparatus 10 controls communications of voice mail.

Voice message storing means 11 stores voice messages transmitted thereto from originators, in a manner associated with respective message numbers (unique numbers identifying the respective voice messages). User information management means 12 manages user information about voice mail users, as described later.

Registration notification information transmitting means 13 changes a form of notification of registration notification information notifying that a voice message has been registered, in accordance with address information registered in the user information, and transmits the resulting registration notification information to a recipient.

According to the present invention, text is transmitted if electronic mail address (hereinafter "mail address") alone is registered as the address information, a URL (Uniform Resource Locator) is transmitted if both telephone number and mail address are registered, and voice data is transmitted if telephone number alone is registered. In FIG. 1, text containing the registration notification information "You have a message from Mr. ΔΔ." is transmitted to a portable telephone 20. Details of the operation will be described later with reference to FIGS. 7 to 10.

After the registration notification information is transmitted from the registration notification information transmitting means 13, the recipient operates his/her portable telephone to enter a predetermined instruction, whereupon voice message replaying means 14 replays the voice message and transmits the replayed voice message to the recipient through a voice channel.

Figure 2:
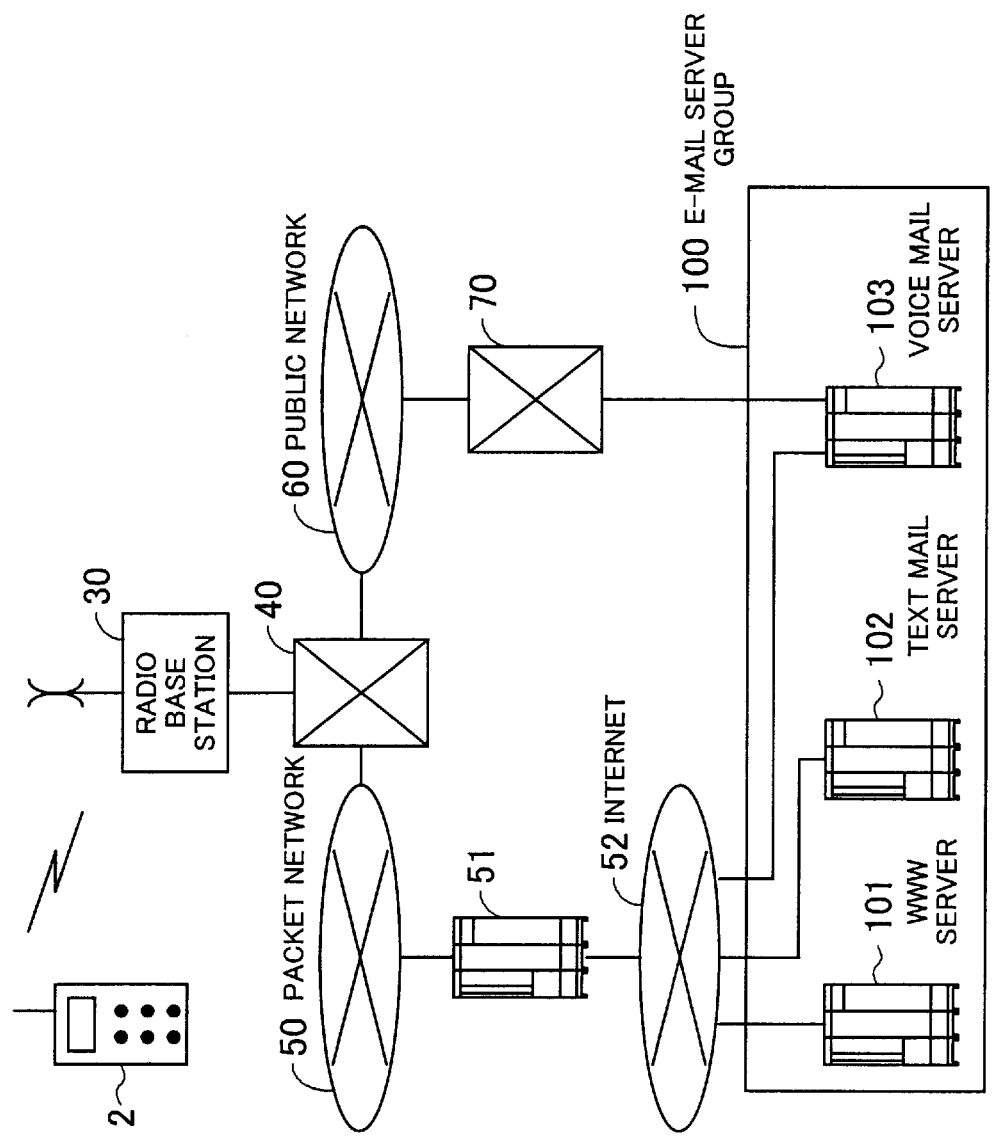
FIG. 2 is a diagram illustrating an exemplary system configuration to which the communication apparatus is applied.

A system configuration will be now described. FIG. 2 illustrates an exemplary system configuration to which the communication apparatus 10 is applied. A radio base station 30, which is connected wirelessly to a portable telephone 2, is connected to an exchange 40, which in turn is connected to a packet network 50 and a public network 60. The packet network 50 is connected via a character-based information service server (i-mode server) 51 and the Internet 52 to an electronic mail server group 100, while the public network 60 is connected via an exchange 70 to the electronic mail server group 100.

The electronic mail server group 100 includes a WWW server 101, a text mail server 102 for providing text mail service, and a voice mail server 103 for registering and replaying voice messages. The WWW server 101, the text mail server 102 and the voice mail server 103 are connected to the Internet 52, and the voice mail server 103 is also connected to the exchange 70.

In the case of applying the communication apparatus 10 of the present invention to the electronic mail server group 100, the voice mail server 103 may be designed to function as the voice message storing means 11, the user information management means 12 and the voice message replaying means 14, and the WWW server 101 and the text mail server 102 may be designed to function as the registration notification information transmitting means 13.

The user information management means 12 will be now described. The user information management means 12 manages, as user information, a personal information list, a multicast recipient list, and a queue management list. The following description is based on an assumption that a voice message is multicast to a plurality of recipients.

FIG. 3 exemplifies the personal information list. The personal information list 12-1 is a list for managing personal information about users who use voice mail service to which the present invention pertains. The list includes the items "User No.", "User Name", "Password", "Phone No.", "Mail Address", "Multicast Recipient List No.", and "Reserved Replay Message No." (used when making reservation for replay, as described later). The address information referred to in this invention includes telephone number and mail address, and the multicast recipient denotes one of multiple recipients who are to receive a multicast voice message.

Under the "Multicast Recipient List No." are shown "Registration A", "Registration B" and "Registration C", and the column "Used" indicates which one of these three multicast recipient lists should be used. In the example shown in FIG. 3, for the user "Ichiro" with the user No. 0101, two multicast recipient lists No. 022 and No. 035 are recorded in the registration columns "A" and "B", respectively, and the multicast recipient list to be used is the list No. 022 corresponding to "Registration A", as specified in the column "Used".

FIG. 4 exemplifies the multicast recipient list. The multicast recipient list 12-2 lists groups of recipients to whom a voice message is to be multicast. When transmitting the registration notification information to each multicast recipient, the registration notification information transmitting means 13 searches the personal information list 12-1 by using the user No. in the multicast recipient list 12-2 as a key, to acquire at least one of telephone number and mail address.

FIG. 5 exemplifies the queue management list. The queue management list 12-3 manages queues of message Nos. of registered voice messages. When a voice message has been registered, the voice message storing means 11 sets a corresponding message No. for each multicast recipient, and when a voice message is to be deleted, the message No. corresponding to the voice message to be deleted is erased from the queue management list 12-3.

Figure 6:
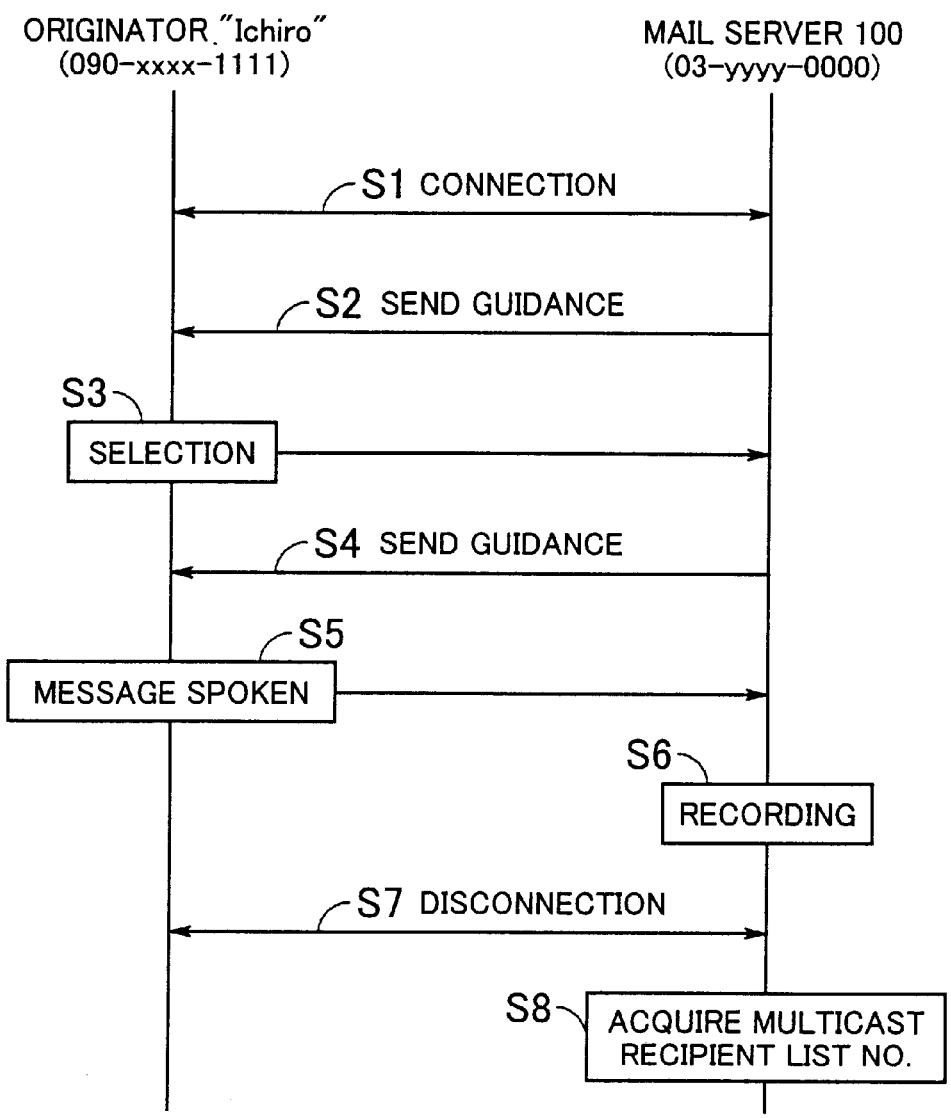
FIG. 6 is a diagram showing a voice message registration sequence.

A sequence of voice message registration will be now described. FIG. 6 illustrates such a voice message registration sequence. In the following, it is assumed that the telephone number of the portable telephone owned by the originator ("Ichiro") is "090-xxxx-1111" and that the telephone number of the electronic mail server group 100 (hereinafter "mail server 100") to which the communication apparatus 10 is applied is "03-yyyy-0000".

[S1] The originator dials "03-yyyy-0000" to establish a connection with the mail server 100.

[S2] The mail server 100 identifies and stores the originator's telephone number ("090-xxxx-1111"), and then transmits guidance. The contents of the guidance may, for example, be "Following the beep tone, please press the number '1' to register your message, or the number '2' to select a multicast recipient list number."

[S3] In this case, the originator selects and presses "1".

[S4] The mail server 100 transmits guidance, the contents of which may, for example, be "Following the beep tone, speak your message."

[S5] The originator speaks his message ("Get together at XXX").

[S6] The mail server 100 records the message as a voice message.

[S7] The originator presses the on-hook button, so that a disconnection process is performed.

[S8] The mail server 100 acquires a multicast recipient list No. based on the telephone number stored in Step S1. For example, where the telephone number is "090-xxxx-1111" as shown in FIG. 3, the multicast recipient list No. 022 is acquired.

A process from the transmission of the registration notification information through to the replay of the voice message will be now described. According to the present invention, the form of notification of the registration notification information includes three patterns, one of which is selected according to the kind(s) of the address information registered.

Figure 7:
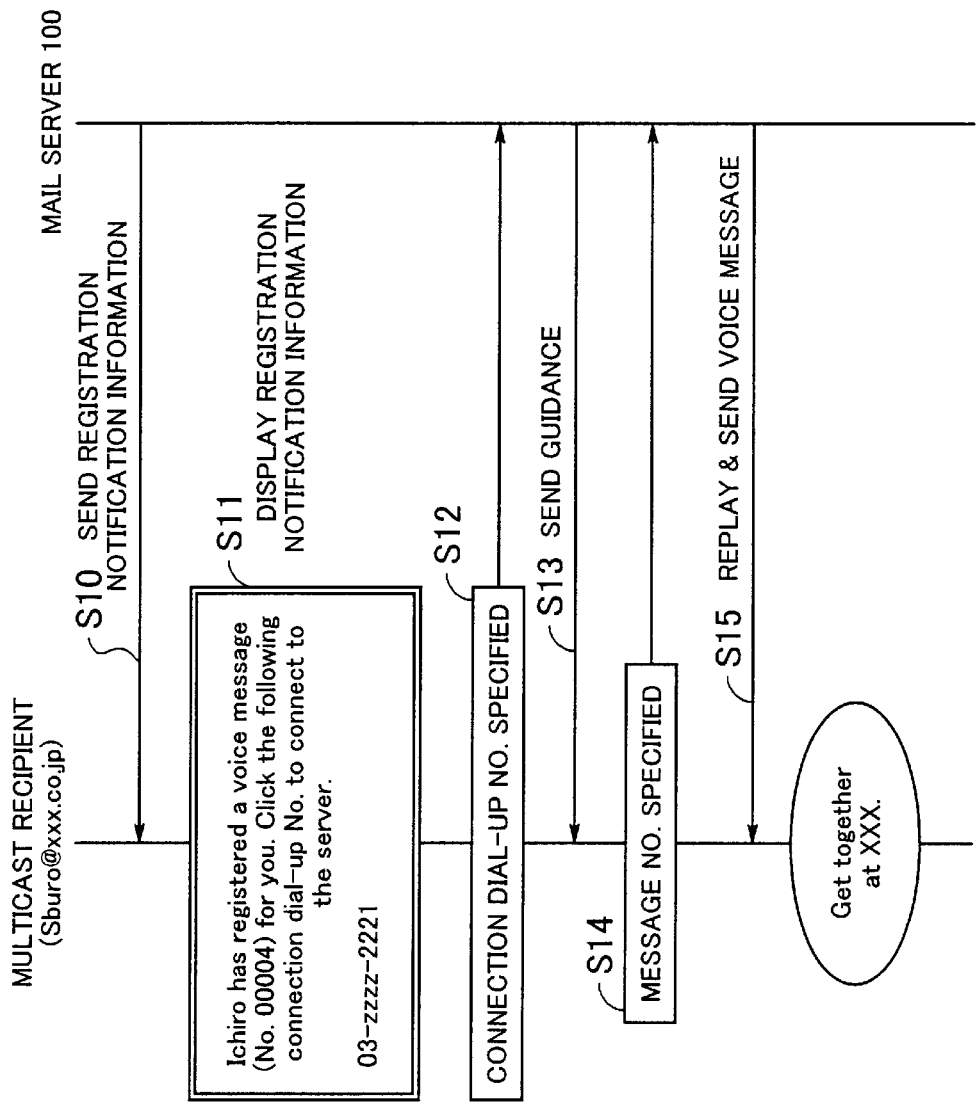
FIG. 7 is a diagram showing a sequence of a process performed when mail address alone is registered as address information.

FIG. 7 illustrates a sequence of process executed in the case where mail address alone is registered as the address information. In the list of FIG. 3, a person whose address information contains mail address only is "Saburo".

[S10] The registration notification information transmitting means 13 sends registration notification information, which includes a connection dial-up number ("03-zzzz-2221") for connecting to the voice message and the message number ("No. 00004") of the voice message, to the multicast recipient ("Saburo") by text mail. Specifically, the registration notification information is transmitted by means of SMTP (Simple Mail Transfer Protocol).

[S11] The registration notification information is displayed on the multicast recipient's portable telephone, as shown in FIG. 7.

[S12] The multicast recipient specifies the connection dial-up number. Specifically, the recipient clicks the connection dial-up number "03-zzzz-2221".

[S13] The mail server 100 transmits voice guidance, of which the contents may be "Following the beep tone, please enter the message number".

[S14] The multicast recipient specifies the message number. Specifically, the recipient presses the buttons in the order "0", "0", "0", "0", "4".

[S15] The voice message replaying means 14 replays the message with the message No. 00004, that is, "Get together at XXX", and transmits the replayed message to the multicast recipient.

Figure 8:
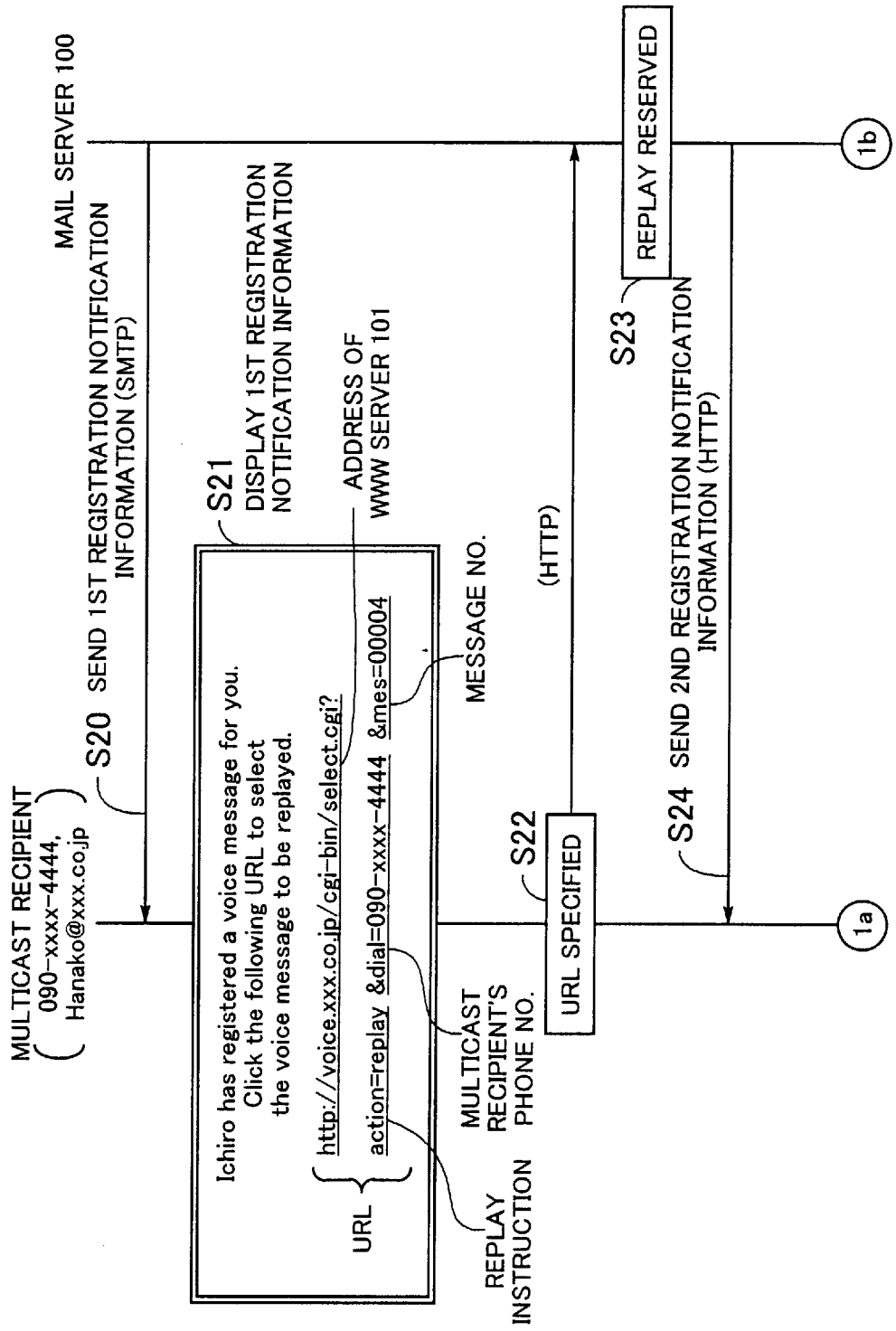
FIG. 8 is a diagram showing a sequence of a process performed when telephone number and mail address are registered as the address information.
Figure 9:
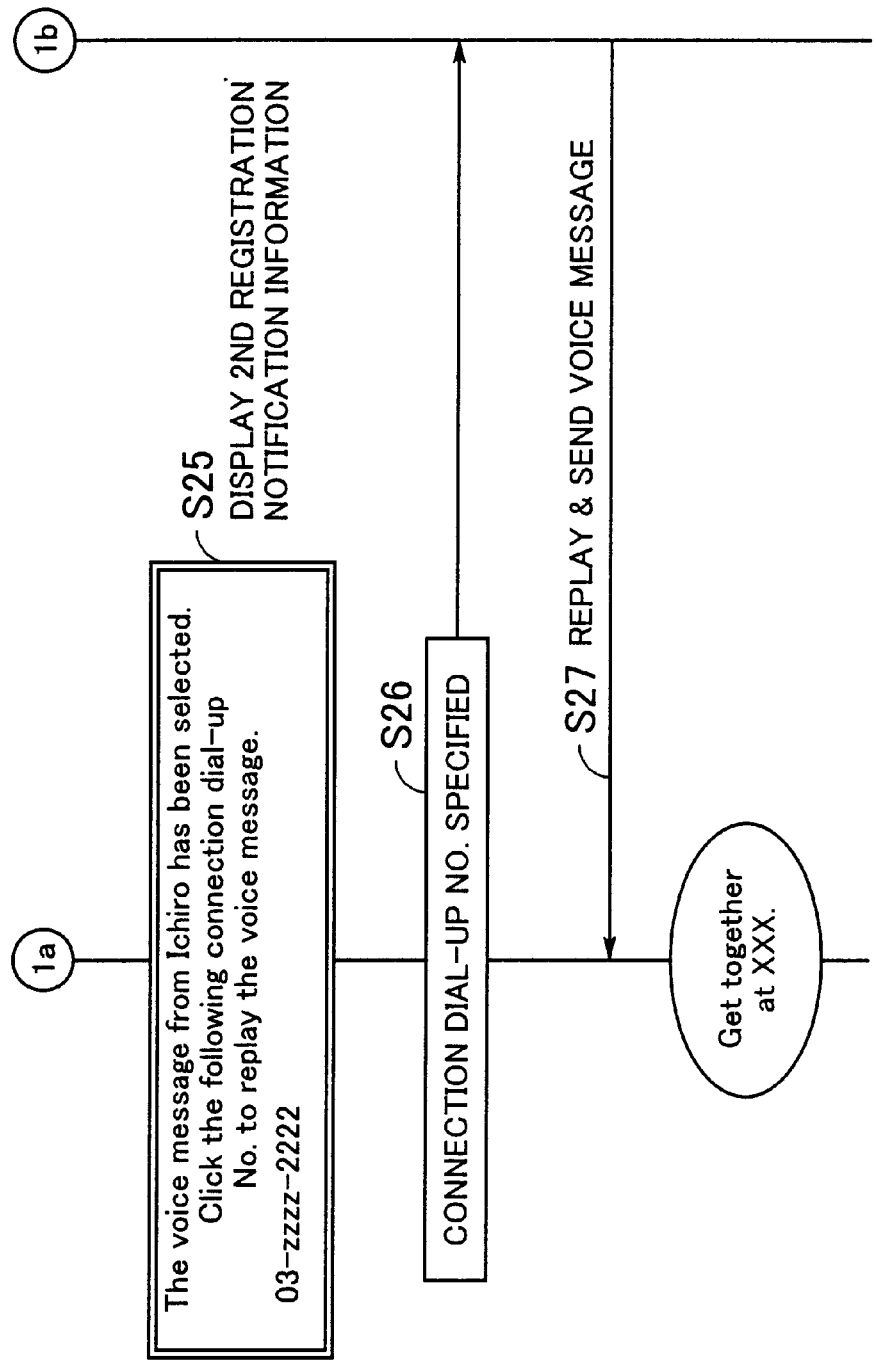
FIG. 9 is a diagram also showing the sequence of the process performed when telephone number and mail address are registered as the address information.

FIGS. 8 and 9 illustrate a sequence of process executed in the case where both telephone number and mail address are registered as the address information. In the list shown in FIG. 3, the address information of "Jiro" and "Hanako", excepting the originator "Ichiro", includes both telephone number and mail address (in the following description, "Hanako" is taken as an example of multicast recipient).

[S20] The registration notification information transmitting means 13 transmits, as first registration notification information, a URL including the telephone number ("Hanako":090-xxxx-4444) and the message number (No. 00004) by text mail (via SMTP).

[S21] The first registration notification information as shown in FIG. 8 is displayed on the multicast recipient's portable telephone.

[S22] The multicast recipient specifies (clicks) the URL. Due to this operation, the telephone number of "Hanako" and the message number (No. 00004) are transmitted to the mail server 100 via HTTP (Hypertext Transfer Protocol).

[S23] The voice message replaying means 14 makes a reservation for replay of the voice message corresponding to the message number (No. 00004). In this case, "00004" is entered in that field of the "Reserved Replay Message No." column which is allocated to "Hanako" in the personal information list 12-1 shown in FIG. 3.

[S24] The registration notification information transmitting means 13 transmits, by text mail (via HTTP), second registration notification information including a connection dial-up number (03-zzzz-2222) for connecting to the voice message with the message No. 00004.

[S25] The second registration notification information as shown in FIG. 9 is displayed on the multicast recipient's portable telephone.

[S26] The multicast recipient specifies the connection dial-up number. Specifically, the multicast recipient clicks the connection dial-up number "03-zzzz-2222".

[S27] The voice message replaying means 14 confirms that the telephone number connected is the telephone number "090-xxxx-4444" of the multicast recipient "Hanako" and that "00004" has been entered in the personal information list 12-1 as the reserved replay message number. Then, the voice message replaying means 14 replays the message with the corresponding message number (No. 00004), that is, "Get together at XXX", with respect to which replay has been reserved in Step S23, so that the replayed message is sent to the multicast recipient.

Thus, according to the processing pattern shown in FIGS. 8 and 9, the URL and the connection dial-up number have only to be specified to replay the voice message. In this control, since the multicast recipient who is to receive the message and the message number to be replayed are reserved in advance before the connection dial-up number is specified, it is unnecessary for the recipient to press the buttons "0", "0", "0", "0" and "4", unlike the case shown in FIG. 7.

Figure 10:
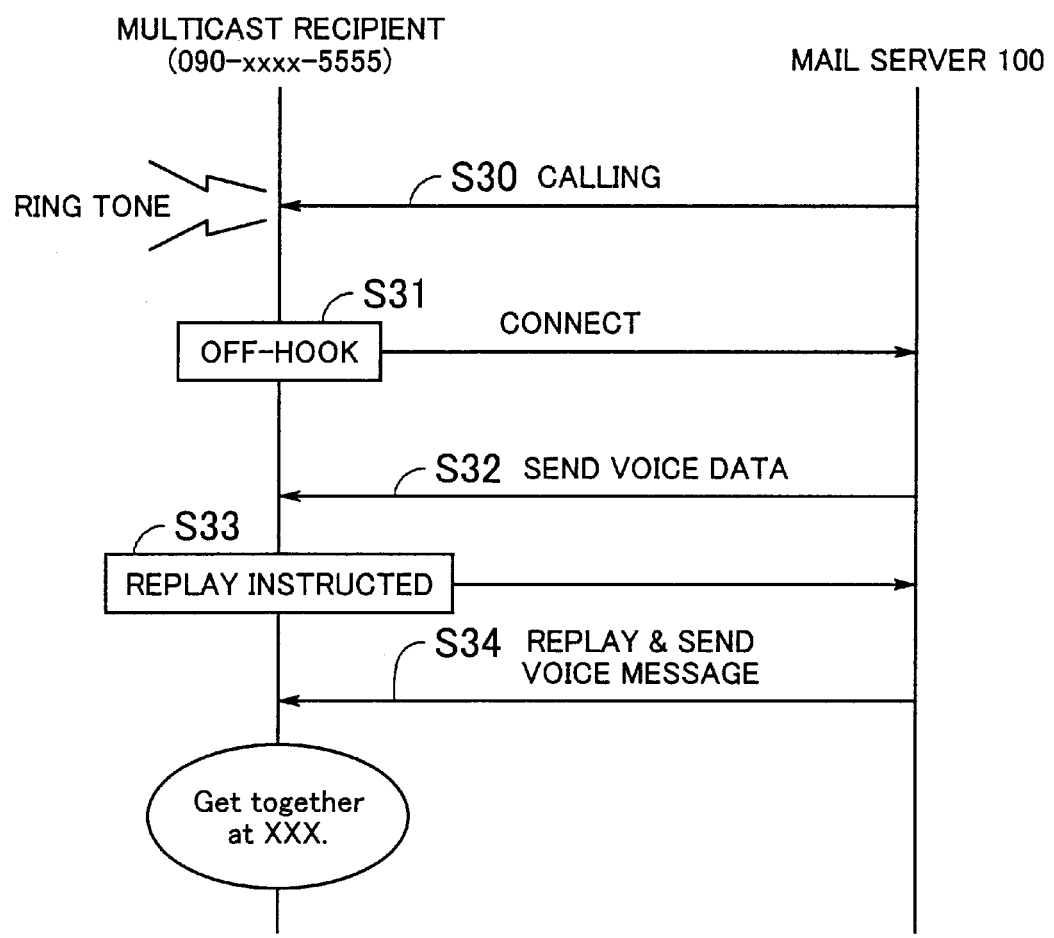
FIG. 10 is a diagram showing a sequence of a process performed when telephone number alone is registered as the address information.

FIG. 10 shows a sequence of process performed when telephone number alone is registered as the address information. In FIG. 3, "Shiro" is a person whose address information contains only the telephone number.

[S30] The registration notification information transmitting means 13 performs a process of calling the telephone number ("Shiro": 090-xxxx-5555).

[S31] The multicast recipient operates the off-hook button, so that connection is established.

[S32] The registration notification information transmitting means 13 transmits voice data as the registration notification information. The contents of the voice data may, for example, be: "You have a voice message from Ichiro. Please press the number '1' to replay the message."

[S33] The multicast recipient transmits "1".

[S34] The voice message replaying means 14 replays the message with the message No. 00004, that is, "Get together at XXX", so that the replayed message is sent to the multicast recipient.

When a voice message addressed to a user has been registered, the registration notification information transmitting means 13 sends the user electronic mail including connection information about the connection to a device (telephone etc.) which allows the user to listen to the voice message over a voice channel.

Figure 11:
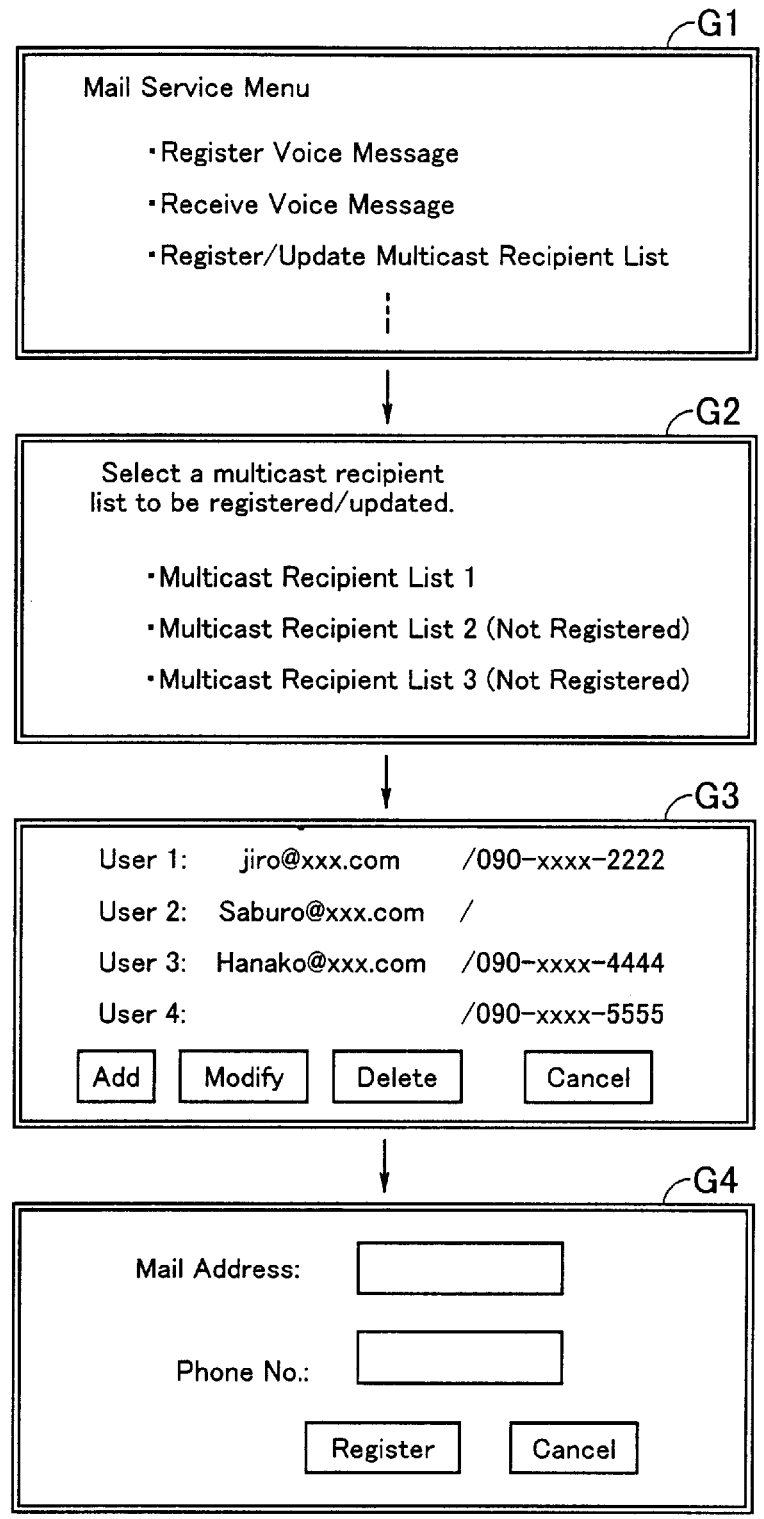
FIG. 11 is a diagram showing a series of screens displayed when a process of registering/updating the multicast recipient list is performed.

A process for registering/updating the multicast recipient list 12-2 will be now described. FIG. 11 illustrates a series of screens displayed when the process for registering/updating the multicast recipient list 12-2 is performed. The screens shown in FIG. 11 are displayed on the user's portable telephone. Information set via the screens is subjected to registration/updating process by the user information management means 12.

A screen G1 is a mail service menu screen. In the screen G1 are shown menu items such as "Register Voice Message", "Receive Voice Message", "Register/Update Multicast Recipient List", etc., and the originator clicks "Register/Update Multicast Recipient List".

A screen G2 is a guidance screen. The originator specifies a multicast recipient list 1 on the guidance screen.

A screen G3 shows contents related to the multicast recipient list 1. The screen G3 shows at least one of the mail address and telephone number of each user, along with buttons "Add", "Modify", "Delete" and "Cancel". It is here assumed that the "Add" button is pressed by the originator.

A screen G4, which is an addition input screen, includes input fields for mail address and telephone number, as well as "Register" and "Cancel" buttons. After the necessary information is entered on the screen G4, the "Register" button is pressed, whereupon an addition process for the multicast recipient list 1 is performed.

Figure 12:
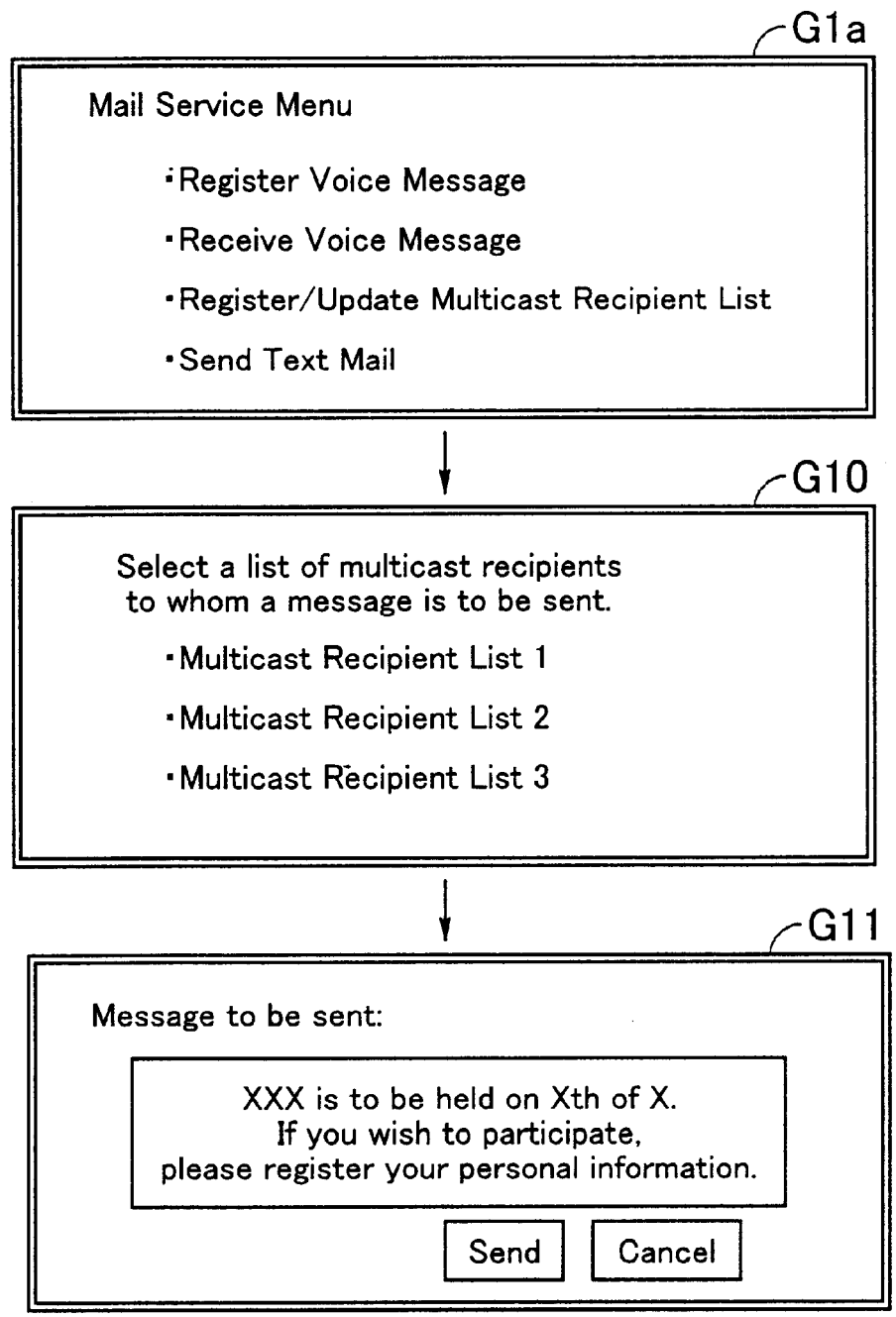
FIG. 12 is a diagram showing a series of screens displayed when a process of registering/updating the personal information list is performed.

A process for registering/updating the personal information list 12-1 will be now described. FIG. 12 shows a series of screens displayed when the process for registering/updating the personal information list 12-1 is performed. The screens shown in FIG. 12 are displayed on the originator's portable telephone. Information set via the screens is processed by the user information management means 12.

A screen G1*a* is a mail service menu screen. In the screen G1*a*, menu items such as "Register Voice Message", "Receive Voice Message", "Register/Update Multicast Recipient List", "Send Text Mail", etc. are shown, and the originator clicks "Send Text Mail".

A screen G10 is a guidance screen, and the originator specifies the multicast recipient list 1 on the guidance screen.

A screen G11, which is a send message input screen, includes an input field for a message to be sent, in addition to "Send" and "Cancel" buttons. After a message is entered in the input field, the "Send" button is pressed.

FIG. 13 shows screens displayed when the process for registering/updating the personal information list 12-1 is performed. The screens shown in FIG. 13 are displayed on a multicast recipient's portable telephone. Information set via the screens is processed by the user information management means 12.

On receiving the screen G11 shown in FIG. 12, the user information management means 12 transmits a screen G20 to each multicast recipient. The screen G20 is a multicast text mail screen and is composed of the message entered by the originator and a URL. The multicast recipient clicks the URL.

A screen G21 is a personal information entry screen. The screen includes fields for entering "User Name", "Password", "Password (Enter again)", "Mail Address" and "Phone No.", as well as the buttons "Register" and "Cancel".

In this manner, the originator sends text mail to each multicast recipient, and in reply the multicast recipient enters his/her personal information in the received text mail. This saves the originator the trouble of registering/updating the personal information of all multicast recipients and thus permits the personal information to be registered/updated efficiently.

As described above, the communication apparatus 10 according to the present invention is designed to transmit registration notification information notifying the registration of a voice message, with its form of notification adaptively changed in accordance with the registered address information, and then to replay the voice message. Thus, it is possible to provide greatly convenient and efficient voice mail service.

In the foregoing, explanation is made of the forms of notification used in cases where only mail address, or both telephone number and mail address, or only telephone number is registered. The registration notification information transmitting means 13 may alternatively be designed such that when a voice message addressed to a user has been registered, it sends the user electronic mail including connection information about the connection to a device (telephone etc.) which allows the user to listen to the voice message over a voice channel.

As described above, with the communication apparatus according to the present invention, registration notification information notifying the registration of a voice message is transmitted to an intended recipient with its form of notification changed in accordance with the address information registered in the user information, and then the voice message is replayed, whereby voice mail service greatly improved in convenience and efficiency can be provided.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication apparatus for controlling communications of electronic mail, comprising:

voice message storing means for storing a voice message in a manner associated with a message number;

user information management means for managing user information about voice mail users;

registration notification information transmitting means for changing a form of notification of registration notification information notifying that the voice message has been registered, in accordance with address information registered in the user information and transmitting the resulting registration notification information to a recipient; and voice message replaying means for replaying the voice message and transmitting the replayed voice message to the recipient through a voice channel wherein, if telephone number and electronic mail address are registered as the address information, said registration notification information transmitting means transmits, as first registration notification information, a URL including the telephone number and the message number to the recipient by text mail and, in response to specification of the first registration notification information by the recipient, transmits second registration notification information including a connection dial-up number for connection to the voice message to the recipient by text mail.

2. The communication apparatus according to claim 1, wherein, if electronic mail address alone is registered as the address information, said registration notification information transmitting means transmits registration notification information including a connection dial-up number for connection to the voice message and the message number to the recipient by text mail.

3. The communication apparatus according to claim 2, wherein said voice message replaying means replays and transmits the voice message when the message number has been specified by the recipient after the recipient specifies the connection dial-up number and establishes channel connection.

4. The communication apparatus according to claim 1, wherein said voice message replaying means makes reservation for replay of the voice message corresponding to the message number when the first registration notification information has been specified by the recipient, and replays and transmits the voice message when the second registration notification information has been specified by the recipient.

5. The communication apparatus according to claim 1, wherein said registration notification information transmitting means is operative in response to registration of a voice message addressed to a user to transmit to the user electronic mail including connection information about connection to a device which allows the user to listen to the voice message through the voice channel.

6. The communication apparatus according to claim 1, wherein, if telephone number alone is registered as the address information, said registration notification information transmitting means performs a calling process and transmits voice data to the recipient as the registration notification information.

7. The communication apparatus according to claim 6, wherein said voice message replaying means replays and transmits the voice message when the message number indicated by the voice data has been specified by the recipient after off-hook operation.

8. The communication apparatus according to claim 1, wherein said user information management means manages personal information entered by a recipient in text mail which has been transmitted to the recipient from an originator.

* * * * *